March 7, 1944.  L. T. CONDE  2,343,749
MILK PAIL HANDLE
Original Filed March 20, 1940
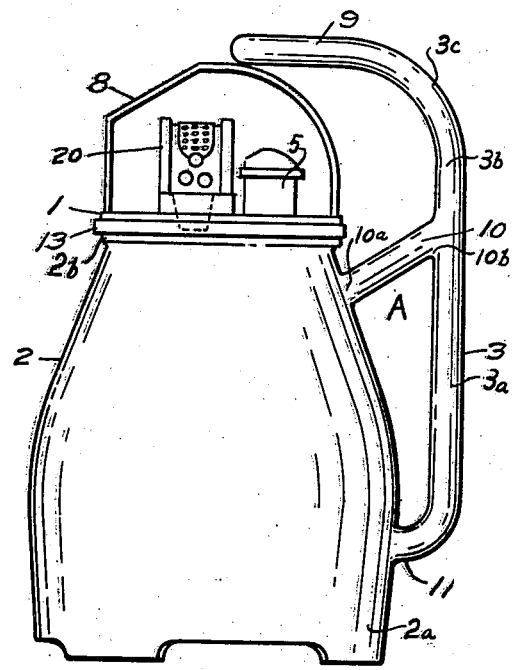
INVENTOR.
*Lyall T. Conde*
BY
*James Harrison Bowen*
ATTY.

Patented Mar. 7, 1944

2,343,749

UNITED STATES PATENT OFFICE 2,343,749

MILK PAIL HANDLE

Lyall T. Conde, Sherrill, N. Y.

Original application March 20, 1940, Serial No. 324,951. Divided and this application January 17, 1942, Serial No. 427,199

2 Claims. (Cl. 220—94)

A principal purpose of this invention is to provide a stationary handle for milk pails and the like, which has an upper extending end that holds the cover in place and which is so positioned that suspension of the pail thereby will cause the substantial balance of the pail with liquid therein from that point.

This is a divisional application being divided from my copending application with the Serial Number 324,951, which was filed March 20, 1940.

Pails have been provided with short rigid handles at the sides, and others have been provided in the form of bails that are hinged at the sides and which extend over and hold the cover. However, it has been found desirable to extend the rigid handle so that the upper end extends over the handle and to a point substantially in line with the longitudinal axis of the pail, with the said extending portion providing a carrying handle which gives balance to the pail.

An object, therefore, of this invention is to provide a pail for milk and the like which has a rigid handle that extends partially over a cover thereof, and from which the pail may be suspended with substantial balance.

Other features and advantages of the invention will appear from the following description taken in connection with the drawing, wherein:

Figure 1 is a view showing a side elevation of the pail equipped with the novel handle of this invention.

In the drawing reference numeral 2 designates the pail and reference numeral 3 designates the handle therefor constituting the subject matter of the invention.

As shown in the drawing the pail or receptacle 2 which is adapted for use in a milking machine system or the like has substantially frusto-conical form. The center of gravity of the pail lies in its lower portion 2a. The pail is provided with a fairly wide open-mouthed top 2b that is adapted to be closed by a suitable removable cover 1 equipped with a suitable pouring spigot 5 and a bail 8. A suitable gasket 13 lies between the rim of the cover 1 and the mouth of the pail 2.

The one-piece handle member 3 for the pail has a portion 3a extending substantially parallel to the axis of the pail and in spaced relationship with respect to the pail. The handle portion 3a is suitably attached by a supporting member 11 to the pail, preferably in the base portion 2a thereof. A second supporting member 10 is rigidly connected at 10a to the pail in its upper portion. This member 10 extends upwardly from the pail and is joined at 10b to said handle member 3.

The supports 10 and 11 maintain the handle member 3 in rigid and spaced relationship with respect to the pail. They and portion 3a form the loop construction A that can be used for pouring purposes to empty the pail. The upper part 3b of the handle 3 which extends from the portion 3a above its junction 10b with member 10 is curved at 3c and is provided, furthermore, with a horizontally-extending portion 9 in spaced relationship with the cover 1 and the top 2b of the pail. The end of portion 9 terminates substantially in alignment with the pail axis so that the portion 9 provides a substantially horizontal handle means for carrying the pail and its contents in a balanced condition without spilling or pouring.

In the embodiment shown, the spacing of the upper portion 9 of the handle with respect to the cover 1 permits the horizontal portion 9 to be grasped by the user substantially in line with the axis of the pail so that the pail may be carried in balanced condition without spilling its contents.

The cover 1 in the embodiment shown has a suitable spigot 5. A suitable pulsator 20 may be attached to the cover for filling the pail.

It will be understood that changes may be made in the construction without departing from the spirit of the invention. One of which changes may be in the shape or design of the cover, another may be in the use of a handle of any other shape in cross section instead of round as shown, another may be in the use of other means for connecting the handle to the cover or pail, and still another may be in the use of this handle with containers for other purposes.

The construction will be readily understood from the foregoing description. In use, the cover may be slid in under the end 9 of the handle to cover the pail. The bail 8 then underlies the portion 9 and the latter ordinarily prevents the cover from coming off. The gasket 13, however, is sufficiently resilient to permit the cover to be removed when necessary. For pouring out the contents of the can through spigot 5, the user grasps the portion 3a of the handle to tilt the pail. For carrying the pail and its contents in a balanced condition, the user grasps the portion 9 of the handle near its end. When the pail is carried by this portion of the handle, the center of gravity of the pail and its contents and the carrying point of the handle are in substantial alignment with the result that the pail and its contents are in balance and may be carried without spilling the contents.

Having thus fully described the invention what

I claim as new and desire to secure by Letters Patent, is:

1. The combination with a milk pail for use in a milking machine system and for receiving a substantial weight of milk having an open mouth with a cover therefor, of a rigid handle member connected to the side of said pail near the bottom thereof and extending beyond the top of said pail, a supporting member connecting said handle member to the upper part of said pail, that part of the handle member between its lower end and said supporting member being spaced from the side of the pail and being substantially parallel to the axis thereof to provide a vertically extending manual grip for pouring purposes, that part of the handle member above said supporting member being bent so as to extend over and in spaced relation to the top of the pail and terminating substantially in alignment with the axis of the pail to provide a horizontally-extending manual grip above the pail so that it may be carried in a balanced condition without spilling or pouring the contents thereof.

2. The combination with a milk pail having a frusto-conical body portion and an open top and a cover for said open top, of a rigid handle extending from the bottom portion of the pail upwardly to a plane spaced above said open top, the lower part of said handle extending parallel to the axis of the pail from a point below the center of the pail to a point at or near the top of the pail and in spaced relation thereto and having two supporting members spaced apart rigidly connecting said handle part to the side of the pail, thus affording an open loop handle construction to be used for pouring purposes to empty the pail, the upper part of said handle being bent and extended over the top of the pail in spaced relation thereto and terminating substantially in alignment with the pail axis so as to provide a substantially horizontal handle means for carrying the pail and its contents in a balanced condition, that is, without spilling or pouring.

LYALL T. CONDE.